United States Patent Office 3,461,845
Patented Aug. 19, 1969

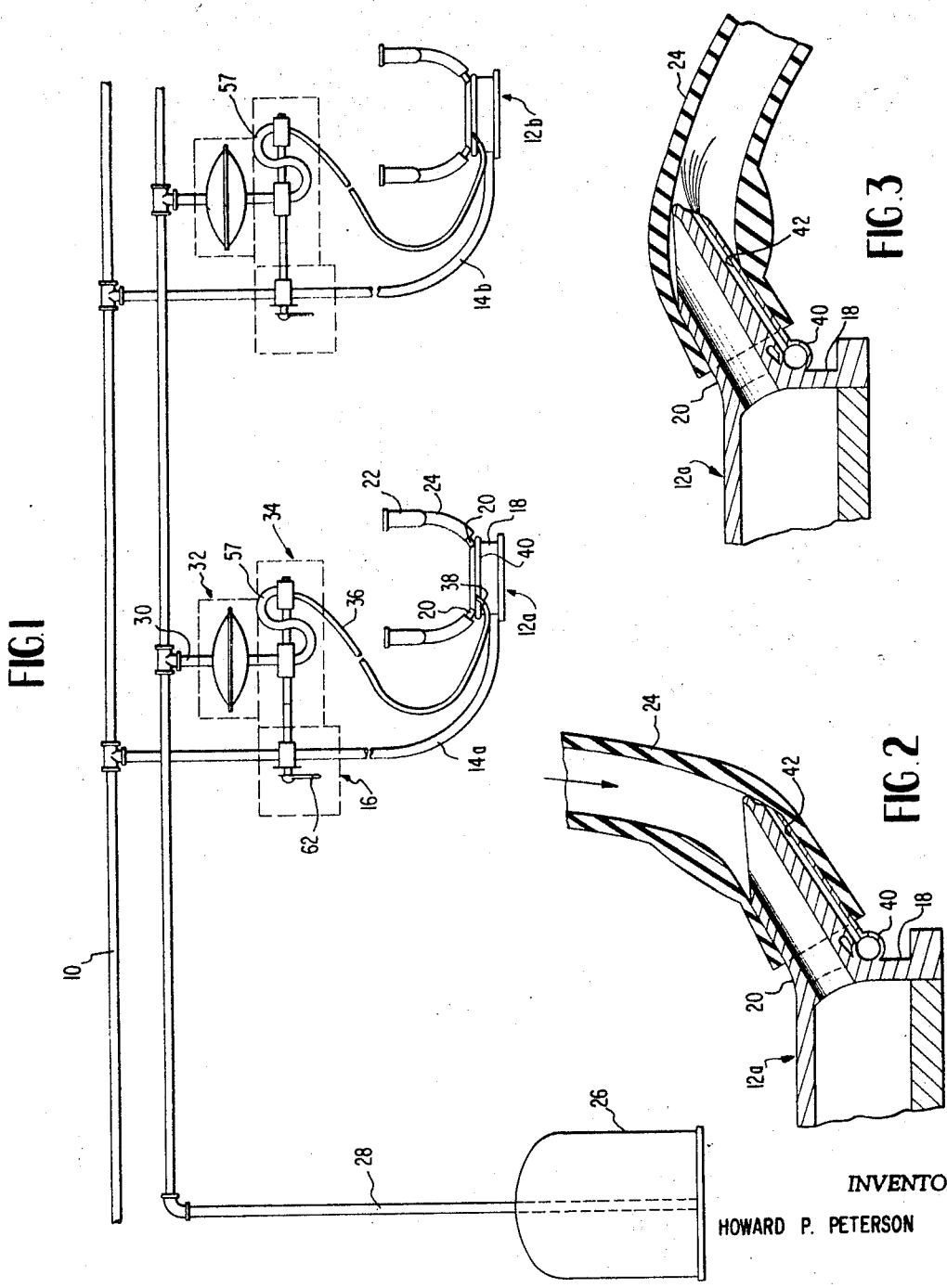

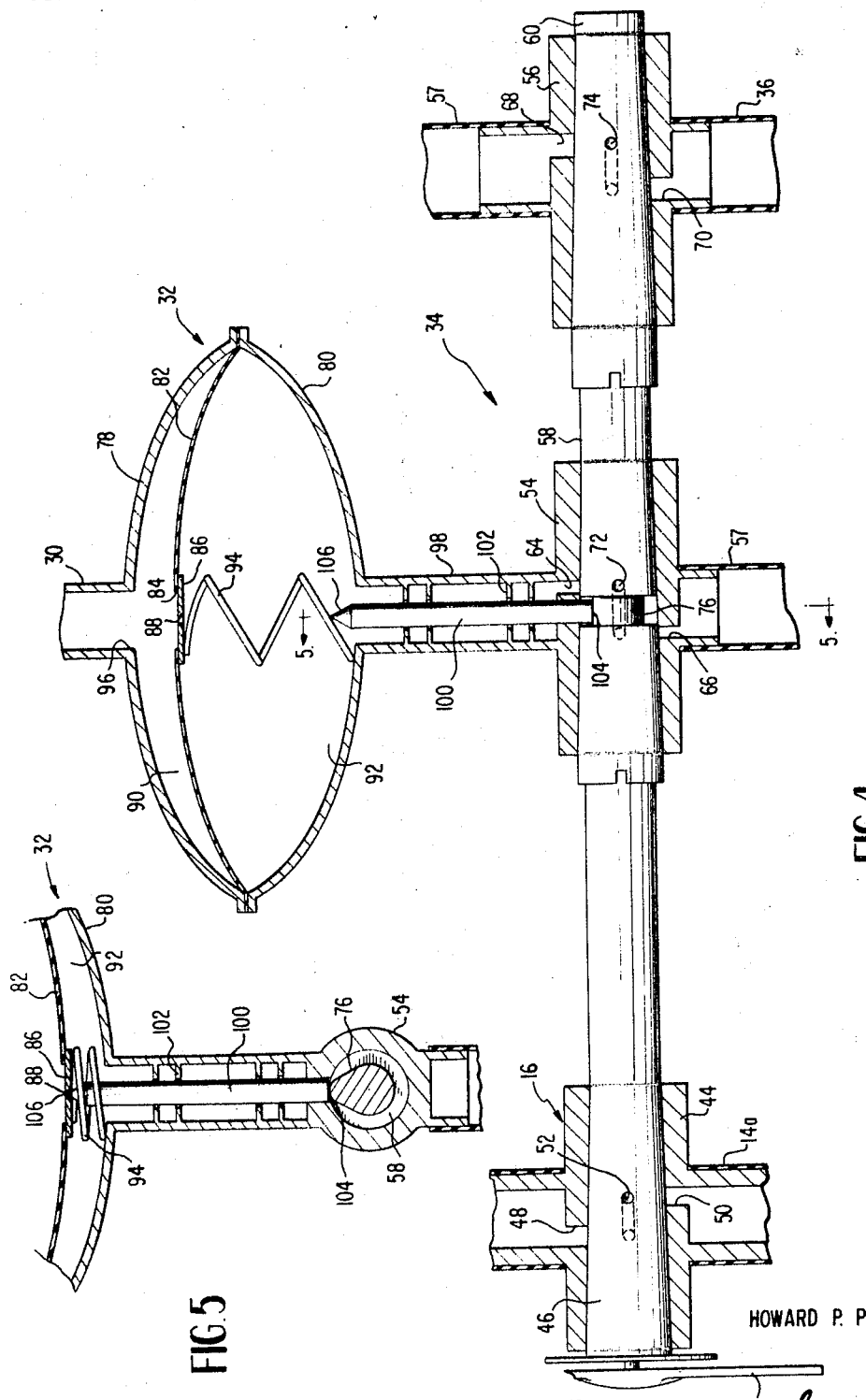

3,461,845
SANITIZING APPARATUS FOR MILKING MACHINES
Howard P. Peterson, Fayetteville, Ark., assignor to Research Corporation, New York, N.Y., a nonprofit corporation of New York
Filed Jan. 23, 1967, Ser. No. 611,092
Int. Cl. A01j 7/00; B08b 9/06, 3/00
U.S. Cl. 119—14.18                    9 claims

ABSTRACT OF THE DISCLOSURE

An apparatus for sanitizing teat cups and milk tubes in a milking machine. Valve controlled sanitizing lines to supply sanitizing fluid to each milk tube and teat cup. A dosage device communicating with the sanitizing lines to deliver a fixed volume of sanitizing fluid to the milk tubes and teat cups for sanitization thereof.

BACKGROUND OF THE INVENTION

This invention relates generally to milking machines and, more particularly, to a novel device for sanitizing the milk tubes and teat cups of milking machines between milking operations.

In the prior art, a major cause for reduced bulk milk quality has been the infection of the bulk milk with milk delivered from cows having mastitis. Mastitis can be generally defined as an inflammation of the udder caused by microbial invasion thereof and such infection results in unacceptable leukocyte and microbial counts in milk produced by infected cattle. It has been estimated that the incidence of mastitis in cattle is as high as 50% during an average of two quarters per cow, and that the annual loss in milk production in the United States due to such infection is between one quarter and one half of a billion dollars. In addition, it should be realized that any level of mastitis infection reduces the quality of the milk and, since there is increasing pressure to raise the quality of milk produced for human consumption, improved control of mastitis is of increasing importance to the dairy industry.

One of the most important areas in which mastitis may be controlled is during milking since, if proper precautions are not taken at this point, microorganisms carried in the teat cup liners and milk tubes of the milking apparatus are quickly transmitted from cow to cow during milking. By reducing the number of microorganisms transmitted in milking apparatus, the incidence of mastitis transmission is reduced, the level of mastitis infection is minimized and the quality of the milk is simultaneously improved.

In the prior art, sanitization of milking machines has been accomplished by mechanically immersing and rinsing the teat cups in an open container of sanitizing solution between milkings. The disadvantages of the prior art process are, firstly, incomplete sanitization due to the near impossibility of forcing the rinse water and sanitizing solution to all parts of the teat cup liner and milk tube and, secondly, the requirement for frequently changing the sanitizing agent to prevent the solution itself from becoming a source of contamination.

SUMMARY

This invention provides means to sanitize milking machines between uses thereof in a much simpler and more effective manner than heretofore possible by furnishing an apparatus which injects an automatically controlled dosage of sanitizing fluid for flushing the interior portions of components of the machine. The invention also furnishes means to effectively valve the machine and the sanitizing apparatus to preclude intermixing of the milk and sanitizing fluid.

It is an object of this invention to provide a novel sanitizing apparatus for use in conjunction with milking machines which overcomes the disadvantages of the prior art by furnishing a self-contained system for flushing the machine between milkings.

It is another object of this invention to provide a sanitizing apparatus for milking machines in which contaminated portions of the machine are sanitized in a more thorough and consistent manner than heretofore possible by flushing the interior portions of the machine with a sanitizing agent.

It is a further object of this invention to provide a sanitizing apparatus for milking machines which precludes contamination from the sanitizing agent by providing means to flush the machine with a quantity of a sanitizing agent which is discharged from the machine subsequent to the flushing operation.

It is still another object of this invention to provide an apparatus for sanitizing milking machines in a consistently effective and automatic manner by furnishing a novel means to supply a predetermined dosage of sanitizing agent to flush the machine.

It is yet a further object of this invention to furnish means to positively segregate milk from sanitizing fluid in a milking machine having a self-contained sanitizng apparatus by providing novel valve means to control the time and path of flow of the respective fluids.

These and other objects of this invention will become more apparent to those skilled in the art by reference to the following detailed description when viewed in light of the accompanying drawings wherein like components throughout the figures thereof are indicated by like numerals, and wherein:

FIGURE 1 is a schematic view of an apparatus in accordance with the inevntion incorporated in a milking machine;

FIGURE 2 is an enlarged fragmentary view, in section, of a portion of the apparatus of FIGURE 1;

FIGURE 3 is a view similar to FIGURE 2, showing the apparatus thereof in another operational configuration;

FIGURE 4 is an enlarged sectional view of another portion of the apparatus of FIGURE 1; and FIGURE 5 is a fragmentary sectional view of a portion of the apparatus of FIGURE 4, taken along the lines 5—5 thereof, and illustrating that portion of the apparatus in another operational configuration thereof.

Although this invention is particularly adapted to, and is specifically described as incorporated in, a milking machine of the "milk claw" type wherein a plurality of milk claw assemblies are connected to a central milk line under suction and, through the claws thereof, to individual inflations to withdraw milk from the cow, it should be understood that the invention may be adapted to other types of milking machines as is found suitable.

DESCRIPTION OF THE PREFERRED EMBODIMENT

Referring now to FIGURE 1, a milking machine, comprising a central milk line 10, connected to a suitable source of vacuum and collection tank (not shown), and communicative with milk claws 12a and 12b through feeder lines 14a and 14b, is shown schematically. Since the milk claw assemblies and the apparatus associated therewith are identical in each assembly, specific reference made hereinafter should be understood as applicable to each assembly. Communication through the feeder lines 14a is controlled by spigot valve 16 of a type well known in the art. The milk claw assembly 12a comprises a hollow body 18 having a nipple communicating with the feeder line 14a in a side thereof and a plurality of milk claws 20 around the upper periphery thereof. A teat cup or inflation 22 is connected to each claw 20 through a milk tube 24. The aforedescribed structure is generally well known in the art, the teat cups or inflations 22 being connected to the teats of a cow and milk withdrawn through the inflations and milk tubes under the influence of vacuum applied thereto. The milk is collected in the body 18 of a claw assembly and transmitted through the feeder lines 14a to the central milk line 10 for collection.

A sanitizing fluid container 26, maintained under pressure by a pump or other suitable means (not shown), is connected to a central sanitizing line 28 which, in turn, is connected, through branch conduits 30, to a dosage device shown generally at 32. The dosage device 32 is connected, through valving means shown generally at 34, to a sanitizing line 36 which in turn communicates, through a nipple 38, with an annular conduit 40 disposed around the claw body 18 adjacent the nipples 20.

Referring now more specifically to FIGURES 2 and 3 of the drawings, the structure of the claw 12a is shown in enlarged detailed for clarity. The exit end or mouth of the nipple 20 is formed at an angle to the longitudinal center line thereof and, in this embodiment, is disposed at a slight angle with respect to the horizontal. The annular conduit 40 is communicative with the interior of the milk tube 24 through a sanitizer injection conduit 42 disposed parallel and adjacent to the nipple 20. As illustrated in FIGURES 2 and 3, the annular conduit 40, the injection conduit 42, the nipple 20, and the housing 18, may all be cast integrally if so desired.

Referring specifically to FIGURE 2, it is seen that the milk tube 24 is disposed in a milking position, or substantially vertically with respect to the milk claw 12a, and in direct fluid communication with the interior of the nipple 20. In this configuration, the lower surface of the tube 24 is pinched against the outermost edge of the nipple, thereby sealing off the exit portion of the sanitizer injection conduit 42. In FIGURE 3, the milk tube 24 is shown in the sanitizing position, lowered to a point where the upper surface of the milk tube 24 contacts the outer lip of the nipple 20, thereby sealing off communication between the interior of the nipple 20 and the tube 24. The lower surface of the tube 24 is disposed below the exit portion of the sanitizer injection conduit 42, thereby enabling fluid communication between the conduit 42 and the interior of the milk tube 24. The above-described structure precludes intermixing of the sanitizer fluid and the milk when the tube 24 is in either the milking or sanitizing position and, as an adjunct to further structure to be described hereinafter, thereby prevents contamination of milk processed through the apparatus with sanitizer fluid.

Referring now to FIGURE 4, the dosage device 32, the valve means 34, and the spigot valve structure 16, are shown in enlarged sectional detail. The valve 16 comprises a housing 44 with a plug valve member 46 rotatably disposed therein. The housing 44 intersects the feeder line 14a and communicates, through offset inlet and exit bores 48 and 50 therewith. The plug valve member 46 controls communication between the bores through a passage 52 formed to provide communication therebetween when the plug is rotated 90 degrees in a clockwise direction as viewed from the left-hand end thereof in the drawing. The valve 16 thereby controls communication between the feeder line 14a and supply of vacuum and the milk claw 12a to which it relates. The valve means 34 comprises a pair of valve housings 54 and 56 serially connected to one another for fluid communication therebetween through a transfer conduit 57. Plug valving members 58 and 60 are rotatably disposed in the housings 54 and 56 and are mechanically interconnected to one another and to the plug valving member 46 of the spigot valve 16. The aforedescribed interconnected plug valving members are actuated by a valve handle 62 mounted proximate the valving member 46. As in valve 16, the valve housings 54 and 56 are provided with offset inlet and outlet bores 64–66 and 68–70, preferably offset, for example, in a direction opposite to that of the bores 48 and 50 of the valve 16. As in the valve 16, the plug valving members 58 and 60 are provided with passages 72 and 74 therethrough which are formed to provide communication between the bores to which they relate, when the plug valving members 58 and 60 are turned 90 degrees in a counterclockwise direction, as viewed from the left hand end of the structure as illustrated. The plug valving member 58 is provided, intermediate at the ends thereof, with a cam surface 76 therearound.

The dosage device 32 comprises upper and lower housings 78 and 80 flanged at their outer peripheries and joined to sandwich a flexible diaphragm assembly 82 therebetween. The diaphragm assembly 82 is formed with opening 84 at the center thereof, which opening is covered with an annular disc 86 having a metering orifice 88 concentrically disposed therethrough. The diaphragm assembly divides the chamber formed by the housings 78 and 80 into upper and lower chambers 90 and 92, respectively. A resilient compression spring 94 is disposed in the lower chamber 92 to normally flex the diaphragm assembly upwardly as illustrated in FIGURE 4. An inlet 96 communicates the upper chamber 90 with the branch conduit 30 while an outlet conduit 98 provides communication between the lower chamber 92 and the inlet bore 64 in the valve housing 54. An elongated valve member 100, concentrically disposed in the exhaust conduit 98, is slidably supported by a plurality of annular inwardly extending flanges 102 for reciprocitory movement therein. The valve member is provided with a lower flat cam follower surface 104 and an upper needle valving end 106 disposed in alignment with the metering orifice 88 of the diaphragm assembly disc 86. By reference to FIGURE 5, it can be better seen that the needle valve member 100 is cammed upwardly by the cam surface 76 when the plug valve member 58 is rotated, in a counterclockwise direction, 90 degrees from the position illustrated in FIGURE 4 so that the needle valving end 106 thereof blocks flow through the metering orifice 88 when the diaphragm 82 is flexed downwardly against the bias of the spring 94.

OPERATION

In operation, referring generally to the apparatus as illustrated in FIGURE 1 and specifically to the milk claw assembly 12a, during the milking operation, the handle 62 is initially disposed 90°, in a clockwise direction, from the position illustrated in that figure. Vacuum is supplied through the central milk line 10 to the feeder line 14a and through the claw assembly 12a to the inflations 22 to withdraw milk in a manner well known in the art. When sufficient milk has been withdrawn, the handle 62 is rotated 90°, in a counterclockwise direction, to the position illustrated in FIGURE 1, and the supply of vacuum to the inflations 22 is terminated. Inflations are then removed from the cow and allowed to hang down so that the milk tube 24 moves from the position shown in FIGURE 2 to the position shown in FIGURE 3 thereby sealing off communication between the interior thereof and the nipples 20 and opening communication to the sanitizer injection conduits 42.

With the claw assembly configured as described above, the handle 62 is rotated 90° further in a counterclockwise direction, and communication through the valve means 34 to the sanitizing supply line 36 is established.

Referring now more particularly to FIGURES 4 and 5, as communication is established through the passages 72 and 74 of the plug valve members 58 and 60, the pressurized sanitation fluid from the container 26 which initially fills the lower chamber 92, is discharged through the exhaust conduit 98, valve housing 54, transfer tube 57, and valve housing 56 to the sanitizing supply line and into the annular conduit 40 in the claw 12a to be injected into the milk tube 24 and inflations 22 through the sanitizer injection conduit 42 for sanitization thereof.

So that the amount of sanitizing fluid injected into the apparatus may be controlled and effective sanitizing of the teat cup liners and milk tubes may be insured, the dosage device 32 provides for the discharge of predetermined quantity of sanitizing fluid into claw assembly as follows: As the sanitizing fluid is discharged from the lower chamber 92, the pressure of the sanitizing fluid from the branch conduit 30 and upper chamber 90 forces the diaphragm 82 downwardly against the bias of the spring 94. Since, as illustrated, the cross-sectional area of the metering orifice 88 is much smaller than that of the branch conduit 30, the sanitizing fluid in chamber 92 is not effectively replaced by flow from the sanitizing container 26 and deflection of the diaphragm 82 continues until the diaphragm reaches the position shown in FIGURE 5 with the valve member 100 blocking further flow through the orifice. When discharge is terminated, the handle 62 is rotated 90° in a clockwise direction from the sanitizing position to thereby block further flow through the valve housings 54 and 56, and to withdraw the needle valving end 106 of the valve member 100 downwardly to open the metering orifice 88. Once open, fluid flow through the metering orifice gradually replenishes fluid in the lower chamber 92 and equalizes pressure across the diaphragm so that, under the influence of the bias of the spring 94, the diaphragm returns to the initial position shown in FIGURE 4 and the dosage device is recharged for the next cycle. When the inflations 22 are hooked to the next cow to be milked, the handle 62 is turned 90° clockwise and vacuum is again applied to the inflations 22 for milking of the cow.

EXAMPLE

In order to test the comparative purging effectiveness of an apparatus constructed in accordance with this invention, one gram of Buffalo black dye was mixed with 100 ml. of milk and 10 ml. of this mixture was introduced into each of the teat cups or inflations of a milk claw assembly. In order to avoid chemical reaction or alteration of the dye, water was used as a purging fluid instead of a sanitizing solution.

Rinsing buckets, of the type used in prior art processes, were filled with eight liters of water and the inflations were rinsed twice. Each rinsing procedure was repeated ten times and, after rinsing, the inflations and milk tubes were removed from the claws and rinsed with 5 ml. of water. The amount of residual dye per ml. of rinse water was then measured on a colorimeter, B and L Spectronic "20" and the amount of dye remaining was recorded.

The above procedure was repeated with an apparatus built and operated in accordance with the invention using a rinsing time of ten seconds at a water pressure at 20 p.s.i. and supplying 117 ml. of water per sanitizer injection conduit. The conduit to the embodiment tested was rectangular in cross-sectional shape; however, injection conduits of other configurations may be utilized as is desired.

Comparatively, the amount of dye remaining in the inflation and milk tube structure after use of the sanitizing apparatus was significantly reduced (P less than .01), the magnitude of reduction being approximately tenfold (e.g., from 2.15 mg. per ml. to .218 mg. per ml.).

What has been set forth above is intended primarily as exemplary to enable those skilled in the art in the practice of the teachings of this invention. It should, therefore, be understood that the invention may be practiced other than as specifically described.

What is new and, therefore, desired to be protected by Letters Patent of the United States is:

1. In a milking machine having at least one inflation assembly adapted to be connected with a milk line and a source of vacuum, the improvement comprising:
   means adapted to contain a source of sanitizing fluid;
   means including a sanitizing line and dosage means for communicating fluid from said containing source to said inflation assembly for flushing of a portion of the interior thereof therewith;
   valve means in said lines to alternately connect said inflation assembly to the said milk line and said sanitizing line, said valve means comprising a first valve controlling communication to the milk line, a second valve controlling communication through said sanitizing line downstream of said dosage means, means to mechanically interconnect said valves for simultaneous actuation thereof and alternate connection of said lines to said inflation assembly.

2. In a milking machine having at least one inflation assembly adapted to be connected with a milk line and a source of vacuum, the improvement comprising:
   means adapted to contain a source of sanitizing fluid;
   means including a sanitizing line for communicating fluid from said containing source to said inflation assembly for flushing of a portion of the interior therewith,
   valve means in said lines to alternately connect said inflation assembly to the said milk line and said sanitizing line, said inflation assembly comprising a milk claw housing having a plurality of tubular milk claw nipples extending therefrom, a sanitizer distribution conduit around said claw housing proximate said nipples and communicative with said sanitizer line, a sanitizer injection conduit extending along each of said nipples and communicative with said distribution conduit, and a flexible milk tube fitted over each of said nipples and injection conduit and communicative with an inflation.

3. An inflation milking assembly comprising a milk claw housing having a plurality of tubular milk claw nipples extending therefrom, a sanitizer distribution conduit around said claw housing proximate said nipples and communicative with a sanitizer line, a sanitizer injection conduit extending along each of said nipples and communicative with said distribution conduit, and a flexible milk tube fitted over each of said nipples and injection conduit and communicative with an inflation.

4. The inflation milking assembly of claim 3 wherein the outer end of each nipple is formed with a milk tube crimping surface, said sanitizer injection conduit on each of said nipples being communicative with the interior of said milk tube proximate said crimping surface, said milk tube being movable between an erect milking position substantially in line with said nipple and a depending sanitizing position substantially normal to said nipples, said crimping surface and said conduit being formed and disposed so that communication between said conduit and said tube is blocked when said tube is in said sanitizing position.

5. A milking machine in accordance with claim 1 wherein said valve means is three-positioned to dispose said valves as follows:

| Valve means position No | 1 | 2 | 3 |
|---|---|---|---|
| First valve | Open | Closed | Closed. |
| Second valve | Closed | do | Open. |

6. A milking machine in accordance with claim 5 wherein said valve means further comprises a third valve, said third valve being disposed in said sanitizing line downstream of said second valve and positioned with respect to said first and second valves as follows:

| Valve means position No | 1 | 2 | 3 |
|---|---|---|---|
| First valve | Open | Closed | Closed. |
| Second valve | Closed | do | Open. |
| Third valve | do | do | Do. |

7. A milking machine in accordance with claim 5 wherein said dosage means comprises:
- a housing having an inlet and outlet communication with upstream and downstream portions of said sanitizing line respectively;
- a flexible diaphragm dividing said housing into first and second portions communicative with said inlet and outlet respectively and deflectible between a first position toward said inlet and a second position toward said outlet, said diaphragm having a metering orifice of substantially less cross-sectional area than said sanitizing line therethrough to provide communication between said housing portions;
- resilient means normally biasing said diaphragm in said first position.

8. A milking machine in accordance with claim 7 wherein said dosage means further comprises:
- a needle valve reciprocably mounted for movement between a retracted position and an extended position blocking flow through said metering orifice when said diaphragm is in said second position; and
- means interconnecting said valve means and said needle valve for actuation thereof between said retracted and extended positions when said valve means is moved between position number two and position number three.

9. A milking machine in accordance with claim 7 wherein the outer end of each nipple is formed with a milk crimping surface, said sanitizer injection conduit on each of said nipples being communicative with the interior of said milk tube proximate said crimping surface, said milk tube being movable between an erect milking position substantially in line with said nipple and a depending sanitizing position substantially normal to said nipples, said crimping surface and said conduit being formed and disposed so that communication between said conduit and said tube is blocked when said tube is in said milking position and communication between said nipple and said tube is blocked when said tube is in said sanitizing position.

References Cited

UNITED STATES PATENTS 2,733,667    2/1956    Hill.

FOREIGN PATENTS 1,017,567    1/1966    Great Britain.

HUGH R. CHAMBLEE, Primary Examiner

U.S. Cl. X.R.

119—14.54; 134—166